United States Patent [19]

Schaffer

[11] Patent Number: 5,039,039
[45] Date of Patent: Aug. 13, 1991

[54] HANGER BRACKET

[76] Inventor: Michael D. Schaffer, 107 Kellogg Way, Santa Clara, Calif. 95051

[21] Appl. No.: 460,820

[22] Filed: Jan. 4, 1990

[51] Int. Cl.[5] .............................. F16L 3/00
[52] U.S. Cl. ....................... 248/59; 52/732; 248/70; 248/218.4; 248/230; 248/300
[58] Field of Search ............... 248/58, 59, 62, 65, 248/70, 218.4, 230, 231.1, 316.1, 327, 219.3, 235, 300, 317, 323, 24; 52/92, 721, 732

[56] References Cited

U.S. PATENT DOCUMENTS

| 1,056,596 | 3/1913 | Sidoli | 248/65 |
|---|---|---|---|
| 2,982,508 | 5/1961 | Larsen et al. | 248/244 X |
| 3,414,219 | 12/1968 | Siegel | 248/65 |
| 3,923,277 | 12/1975 | Perrault et al. | 248/70 X |
| 3,958,351 | 5/1976 | Summey | 248/230 X |
| 4,463,510 | 8/1984 | Windish | 248/300 X |

FOREIGN PATENT DOCUMENTS 0214577 5/1941 Switzerland .......................... 248/58

Primary Examiner—Ramon O. Ramirez
Attorney, Agent, or Firm—John J. Leavitt

[57] ABSTRACT

Presented is a generally L-shaped pre-manufactured bracket designed for application to installed hanger rods in concrete buildings to provide a means of installing and supporting a cross-beam which, in turn, is utilized to support additional equipment, such as electrical conduits and pipes.

7 Claims, 1 Drawing Sheet

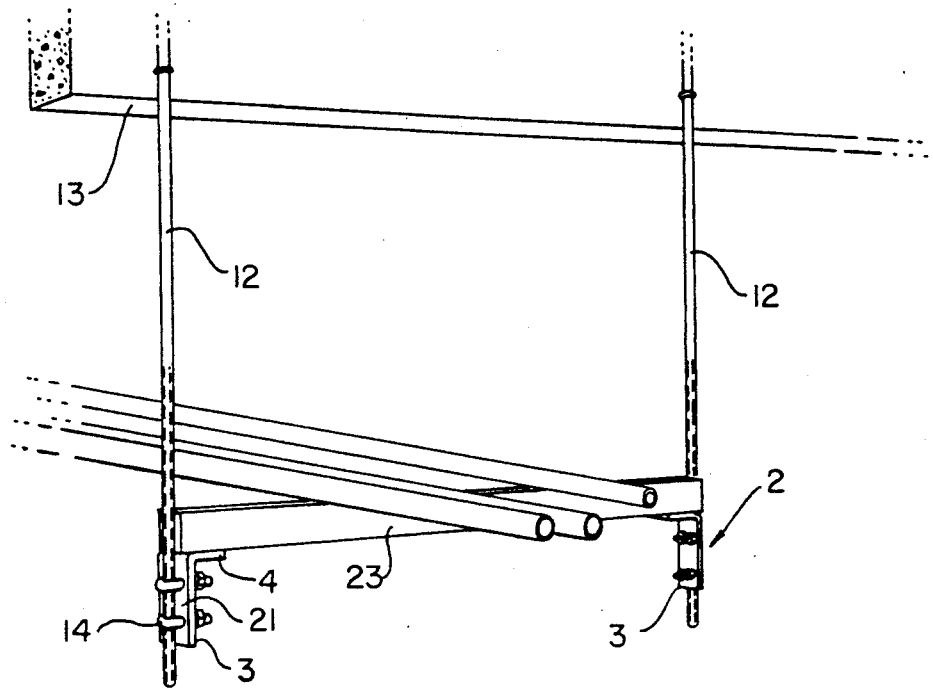
FIG. 1
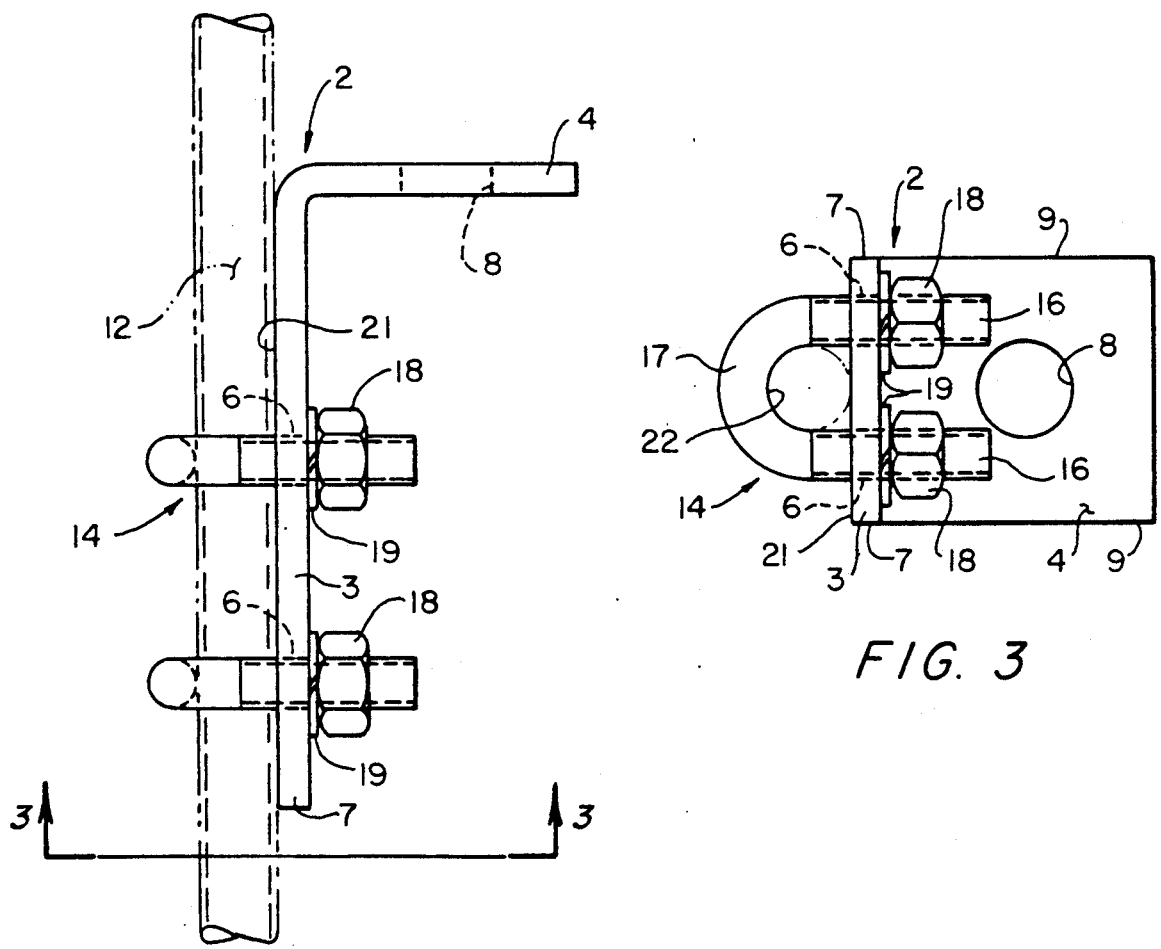
FIG. 2
FIG. 3

HANGER BRACKET

BACKGROUND OF THE INVENTION.

1. Field of the Invention.

This invention relates to hanger brackets, and more particularly to a hanger bracket for attachment to existing suspension rods of the type that depend from basement ceilings for the support of waste lines and other structures.

2. Description of the Prior Art.

A preliminary patentability and novelty search conducted in Class 248, sub-classes 317, 323 and 327 revealed the existence of three U.S. Pat. Nos. as follows:

| 2,631,809 | 3,136,841 | 3,863,879 |
| --- | --- | --- |

U.S. Pat. No. 2,631,809 relates to a furring hanger for attachment in three different ways to a suspended and threaded rod. The furring hanger is provided with lateral extensions that are apertured to receive the threaded rod, and a Tinnerman-type nut is threaded onto the lower end of the threaded rod to position the hanger at an appropriate level. In a second embodiment of the invention disclosed in this patent the proper level of the hanger bracket is determined by a common hex-nut screwed onto the threaded rod, while in a third embodiment disclosed in this patent, the lateral extensions of the first embodiment are replaced by an extension that comprises a double thickness of the sheet material threaded to threadably receive the lower end of the threaded rod.

U.S. Pat. No. 3,136,841 relates to a combined busway hanger and hanger adaptor. The adaptor is the only part of this assembly that bears any pertinency to the hanger bracket forming the subject matter of the instant invention and such pertinency is remote.

U.S. Pat. No. 3,863,879 relates to an apparatus for mounting a ceiling air terminal. Structurally and functionally, there appears to be little relevance between the teaching of this patent and the instant invention.

When multi-story buildings are constructed, it is frequently the practice to excavate for a below grade level garage or basement, and it is usual in such instances, particularly where the ceiling of the basement is poured concrete, to embed within the concrete threaded metallic blocks to which are attached threaded rods that depend perpendicularly downwardly from the ceiling, usually in spaced pairs, for the support of various types of equipment, such as waste lines, water lines and electrical conduits. The three patents noted above illustrate some of the methods in which such threaded rods are utilized to support such equipment. A difficulty arises however when, long after construction has been completed, additional equipment must be installed and supported from the same threaded rods already in use for support of the original equipment. Accordingly, it is one of the objects of the present invention to provide a hanger bracket that may be quickly and easily attached to an already existing suspended rod without disturbing the equipment already supported thereby.

In some structures, the equipment supported on the depending rods is supported near the bottom of the rods on cross beams secured to the rod's clips or nuts as in the patents noted above. There frequently exists a large space above existing equipment that may be utilized to support additional belatedly installed equipment. It is therefore another object of the invention to provide a pre-manufactured hanger bracket that may be easily, quickly and securely detachably secured to the already existing rods in the space between existing equipment and the ceiling from which it is suspended without disturbing the location of existing equipment.

Another object of the invention is the provision of a pre-manufactured hanger bracket that may be used in pairs attached to pairs of depending suspension rods to form spaced platforms to which a cross beam may be detachably secured to form a support plane for equipment to be supported by the rod-suspended hanger brackets.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the hanger bracket of my invention comprises a metallic pre-manufactured generally L-shaped member having leg portions projecting at right angles to each other. One of the legs is provided with at least one pair of trasnsversely spaced apertures, and a U-bolt having threaded shanks extending through the apertures is supported on the leg and is provided with nuts on the threaded shanks so that a depending rod may be caught in the bight between the U-bolt and the leg of the bracket to releasably yet securely, clamp the bracket to the associated rod. The other leg of the bracket, extending at right angles, and generally horizontal when the bracket is suspended on a rod, is provided with an aperture utilized for securing a cross beam to the bracket leg. The cross beam extends horizontally between a pair of spaced brackets and forms a support plane on which equipment to be installed may be supported on the already existing suspensory rods.

BRIEF DESCRIPTION OF THE DRAWINGS

FIG. 1 is a perspective view illustrating a pair of brackets mounted on a pair of depending suspensory rods and connected by a cross beam forming a support plane for equipment.

FIG. 2 is a side elevational view of one of the hanger brackets mounted on a threaded rod and presenting a horizontal leg portion to which a cross beam may be secured. The hanger bracket is shown approximately full size.

FIG. 3 is an end elevational view taken in the direction of the arrows 3—3 in FIG. 2.

DESCRIPTION OF THE PREFERRED EMBODIMENT

In terms of greater detail, the hanger bracket of the invention comprises a pre-manufactured member designated generally by the numeral 2, and preferably formed from steel or such other material as might be appropriate for the loads to be carried by the hanger bracket. The hanger bracket is preferably formed in an L-shape, having one long leg 3 integral with a shorter leg 4 extending perpendicularly to the long leg. There is provided in the long leg at least one pair of laterally spaced apertures or bores 6. Preferably, there are two pairs of such laterally spaced apertures, the pairs of apertures being spaced longitudinally along the long leg, with one pair of apertures being spaced from the perpendicular shorter leg 4, at about the midpoint of the length of the long leg, while the remaining pair of laterally spaced apertures are spaced between the first pair of apertures and the free end of the long leg remote from the perpendicular shorter leg 4. As shown in the drawing, the corresponding apertures of the pairs of apertures are transversely positioned adjacent opposite long edges 7 of the long leg 3. The short leg 4 is provided with a single aperture 8 situated medianly of the side edges 9 of the leg 4 as shown in FIGS. 2 and 3.

To detachably secure the bracket so formed, or a pair thereof in facing relationship as shown in the drawing, to a depending suspensory rod 12, which itself is suspended from a concrete ceiling structure 13, or other support structure, the hanger bracket is provided with a U-bolt designated generally by the numeral 14 and having a pair of spaced parallel leg portions 16 connected at associated ends by a U-shaped section 17. The U-bolt assembly is formed from an appropriate steel, and the leg portions 16 are threaded to receive complementarily threaded nuts 18 and lock washers 19 as shown.

As illustrated in FIG. 2, the hanger bracket is preferably provided with two such U-bolt assemblies, each U-bolt assembly operatively associated with one of the pairs of spaced apertures so that the threaded leg portions of the U-bolt assembly project in the direction of the shorter leg 4 while the connecting U-shaped section 17 lies on the opposite side of the long leg 3 from the nut and washer assembly, i.e., adjacent the surface 21 of the long leg 3.

Referring to FIG. 2, it will be seen that the hanger bracket 2 may be detachably mounted on the associated suspensory rod 12 by inserting the rod through the bight 22 formed between the U-shaped inner periphery of the U-bolt and the surface 21 of the associated long leg 3. After insertion, the nuts 18 of the U-bolt assembly are tightened to draw the U-bolt tightly against the associated rod, thus clamping the hanger bracket to the rod. It should be understood that while most suspensory rods are elongated and threaded, the hanger bracket of the invention may just as easily and just as securely be detachably secured to a completely smooth rod or pipe of appropriate size for the support of a cross beam 23 as illustrated in FIG. 1.

It should also be apparent that while I have described my hanger bracket as having particular usefullness when attached to a vertically depending rod, threaded or not, the hanger bracket may also be attached to a horizontal member with equal ease. I have found that the nuts 18 need not be tightened to any extraordinary extent for the reason that, as viewed in FIG. 2, a downwardly directed force on the short leg 4 results in a binding force being imposed on the U-bolt assembly, with the U-shaped section being drawn tightly against the rod by such downwardly directed force even when the nuts 18 are relatively loose. This is an advantage because it speeds up the installation of added equipment through minimizing the amount of time to install the hanger brackets.

When the hanger bracket is mounted on a horizontally extending support rod or pipe, a downwardly directed load on the projecting short leg 4 develops a rotary moment in the hanger bracket that is resisted by the U-bolt assemblies through transferance of the force of the rotary moment to the horizontal rod or pipe 12 to which the hanger bracket is secured by the U-bolt assemblies.

Having thus described the invention, what is believed to be new and novel and sought to be protected by letters patent of the United States is as follows.

I claim:

1. As an article of manufacture, a load-bearing hanger bracket comprising:
   (a) a monolithic metallic pre-manufactured body formed to provide a pair of integral L-shaped legs extending at right angles to each other with one of the legs having at least one pair of transversely spaced apertures therein while the remaining leg has at least one aperture therein; and
   (b) means cooperating with the pair of transversely spaced apertures in said one leg for detachably securing the hanger bracket directly to an associated rod so that the other leg extends away from the associated rod.

2. The load-bearing hanger bracket according to claim 1, in which said apertures of said pair of transversely spaced apertures are spaced adjacent opposite long edges of the leg in which they are formed.

3. The load-bearing hanger bracket according to claim 1, in which said apertures of said pair of transversely spaced apertures are equally spaced on opposite sides of a plane coincident with the longitudinal center line of the leg in which they are formed.

4. The load-bearing hanger bracket according to claim 1, in which said means cooperating with said pair of transversely spaced apertures in said one leg for securing the hanger bracket to a supporting rod comprises at least one U-bolt assembly including a pair of spaced threaded legs extending through said pair of transversely spaced apertures and joined on one side of said leg by a U-shaped section and provided on the opposite side of said leg with complementarily threaded nuts threadably engaging said threaded legs.

5. The load-bearing hanger bracket according to claim 1, in which said at least one aperture in said remaining leg is positioned medianly therein.

6. The load-bearing hanger bracket according to claim 1, in which the L-shaped leg having at least one pair of transversely spaced apertures is longer than the remaining leg.

7. The load-bearing hanger bracket according to claim 6, in which said longer L-shaped leg is provided with two pairs of transversely spaced apertures spaced longitudinally along the long leg, with one pair of transversely spaced apertures being spaced from the perpendicular shorter leg at about the midpoint of the length of the long leg, while the remaining pair of transversely spaced apertures are spaced between the first mentioned pair of apertures and the free end of the long leg remote from the perpendicular shorter leg.

* * * * *